United States Patent
Muenkel et al.

(10) Patent No.: US 12,235,838 B2
(45) Date of Patent: Feb. 25, 2025

(54) CREATION OF STRUCTURED SET OF FACTS VIA ENTERPRISE INFORMATION DISCOVERY

(71) Applicant: SAP SE, Walldorf (DE)

(72) Inventors: Markus Muenkel, Reilingen (DE); Mitko Kolev, Walldorf (DE); Daniel Ritter, Heidelberg (DE); Manuel Holzleitner, Schwäbisch Gmünd (DE)

(73) Assignee: SAP SE, Walldorf (DE)

( * ) Notice: Subject to any disclaimer, the term of this patent is extended or adjusted under 35 U.S.C. 154(b) by 98 days.

(21) Appl. No.: 18/065,819

(22) Filed: Dec. 14, 2022

(65) Prior Publication Data
US 2024/0202190 A1 Jun. 20, 2024

(51) Int. Cl.
*G06F 16/20* (2019.01)
*G06F 16/242* (2019.01)
*G06F 16/2453* (2019.01)
*G06F 16/25* (2019.01)

(52) U.S. Cl.
CPC .... *G06F 16/24534* (2019.01); *G06F 16/2433* (2019.01); *G06F 16/258* (2019.01)

(58) Field of Classification Search
CPC .......... G06F 16/24534; G06F 16/2433; G06F 16/258
See application file for complete search history.

(56) References Cited

U.S. PATENT DOCUMENTS

| | | | |
|---|---|---|---|
| 11,392,605 B1 * | 7/2022 | Baskaran | G06F 16/254 |
| 2020/0293503 A1 * | 9/2020 | P | G06N 5/04 |
| 2020/0410009 A1 * | 12/2020 | Kolev | G06F 16/2433 |

* cited by examiner

*Primary Examiner* — Kristopher Andersen
(74) *Attorney, Agent, or Firm* — Buckley, Maschoff & Talwalkar LLC

(57) ABSTRACT

According to some embodiments, a central cloud-based repository of data may contain consolidated facts about enterprise applications. A computer processor of a discovery engine may execute discovery in a local application process and, based on the executed discovery, automatically create a generic structured set of facts from locally accessible data. The discovery engine may then store the generic structured set of facts in the central cloud-based data repository using a standard format (e.g., JSON). The central cloud-based data repository may, for example, store facts from different application instances and/or facts from different applications. According to some embodiments, a user generated query is created in a query language (e.g., SQL) and executed on the central cloud-based repository of data to automatically create an answer. Moreover, an automated ML agent may, in some embodiments, evaluate information in the central cloud-based repository of data.

19 Claims, 12 Drawing Sheets

CREATION OF STRUCTURED SET OF FACTS VIA ENTERPRISE INFORMATION DISCOVERY

BACKGROUND

An enterprise may store a substantial amount of enterprise information. For example, an enterprise might store information about application execution, database performance, operational data, etc. A user may want to analyze enterprise information to evaluate performance over time, make predictions about future operations, allocate resources among organizations, etc. Typically, this is done by collecting scalar value metrics, such as Key Performance Indicator ("KPI") values, and then creating queries of those values to analyze the data. However, such an approach is limited because the types of metrics to be collected need to be determined in advance. That is, if a new question is posed by a user there might not be any stored metrics readily available to help with the analysis. Note that traditional architectures typically have the following components: data providers, mappings, a common domain model, and a repository. As a result, when a new data provider is added, a new mapping/transformer is needed that maps the new data type from that provider to the common domain model (and eventually must "enrich" the domain model if the data does not fit). Manually mapping, collecting information, and creating queries in this way can be a time consuming and error prone process—especially when a substantial amount of information (e.g., millions of enterprise data records) and/or a large number of queries are involved.

It would therefore be desirable to automatically analyze enterprise information (e.g., in a cloud computing environment) related to deployed applications (e.g., including technical and business-related data) in an efficient and accurate manner.

SUMMARY

According to some embodiments, methods and systems may analyze enterprise information related to deployed applications (e.g., including technical and business-related data) in an efficient and accurate manner. A central cloud-based repository of data may contain consolidated facts about enterprise applications. A computer processor of a discovery engine may execute discovery in a local application process and, based on the executed discovery, automatically create a generic structured set of facts from locally accessible data. The discovery engine may then store the generic structured set of facts in the central cloud-based data repository using a standard format (e.g., JavaScript Object Notation ("JSON")). The central cloud-based data repository may, for example, store facts from different application instances and/or facts from different applications. According to some embodiments, a user generated query is created in a query language (e.g., SQL) and executed on the central cloud-based repository of data to automatically create an answer. Moreover, an automated ML agent may, in some embodiments, evaluate information in the central cloud-based repository of data.

Some embodiments comprise: means for executing, by a computer processor of a discovery engine, discovery in a local application process; based on the executed discovery, means for automatically creating a generic structured set of facts from locally accessible data; and means for storing the generic structured set of facts in a central cloud-based data repository using a standard format, wherein the central cloud-based data repository contains consolidated facts about the deployed enterprise applications (note that there may be tens of thousands of enterprise customers in the cloud).

Some technical advantages of some embodiments disclosed herein are improved systems and methods associated with analyzing enterprise information related to the deployed applications (e.g., including technical and business-related data) in an efficient and accurate manner.

DETAILED DESCRIPTION

Figure 1:
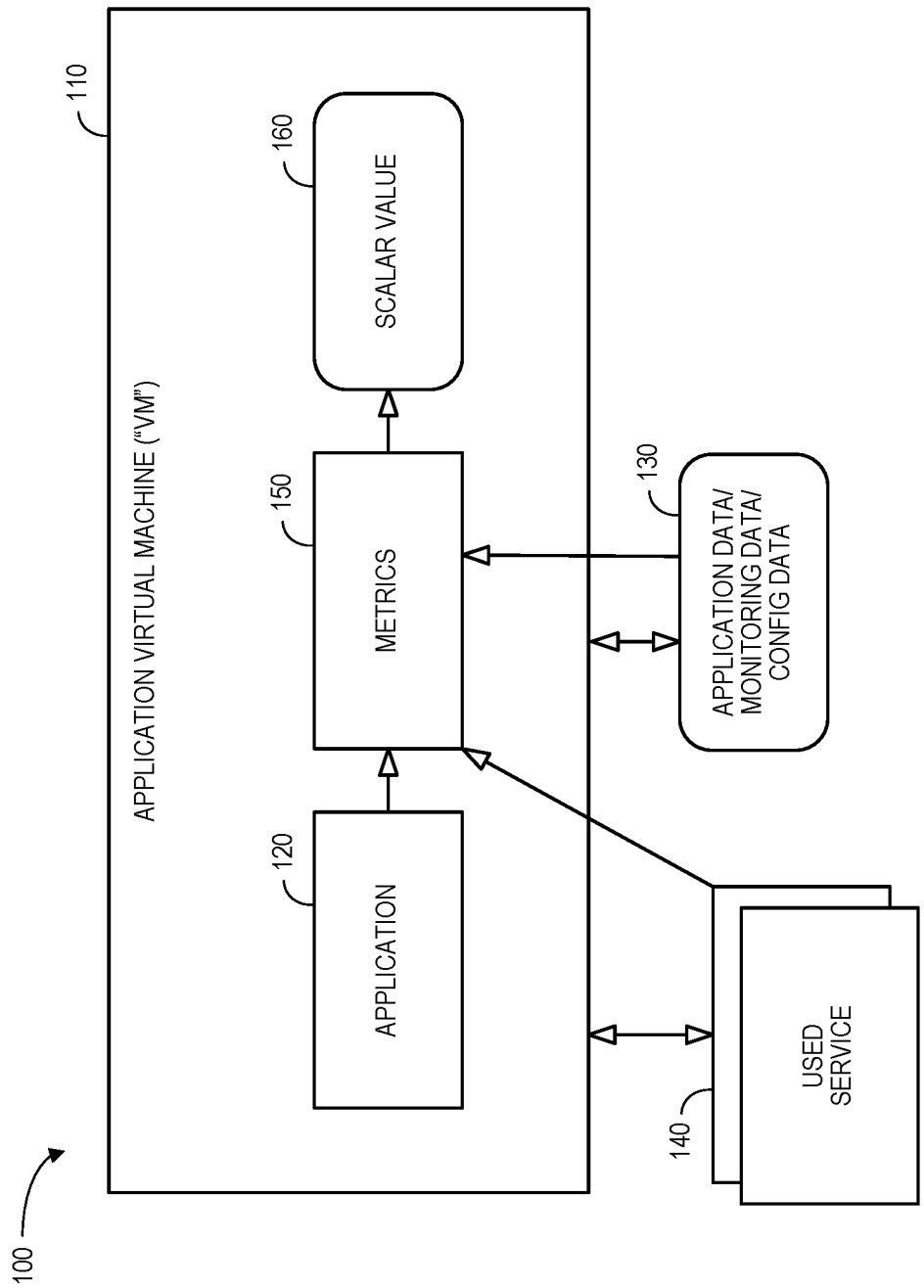
FIG. 1 is a system to access locally available metrics from different sources to expose traditional metrics (and perform evaluations based on locally available data).

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A cloud computing environment may provide elastic scaling and relatively low-cost operation for applications and users, but it can also make operations and support more challenging because of heterogeneous "out-of-hand" deployments (e.g., servers associated with other organizations and/or different tools used by different platform vendors). This can be especially true across a substantial number of virtualized nodes within one offering of one cloud platform provider (or even across different cloud platforms in multi-clouds). For example, managing and operating a complex product with tens of thousands of deployments in a multi-cloud environment (where product parts might be be distributed and operated across different cloud platform vendors), it may be essential for the vendor of those applications and/or products to have full insight into the state of all of the deployments.

However, the traditional approach to expose metrics and KPIs may not be sufficient, because in many cases the required insights are of complex nature and requests for new types of insights constantly arise. In addition, different interested parties (e.g., product support, product management, development, executive management, devops, etc.) may require different perspectives based on their operating focus. For example, a product owner may be interested in the use of new features (to decommit features that are not widely used), a development user may be interested in how software is used and the impact of bug fixes, while management may be primarily focused on application availability and margins. These perspectives can change or evolve (e.g., a new type of outage may require a user to drill deeper into a certain part of the system to identify and understand the issue).

Figure 2:
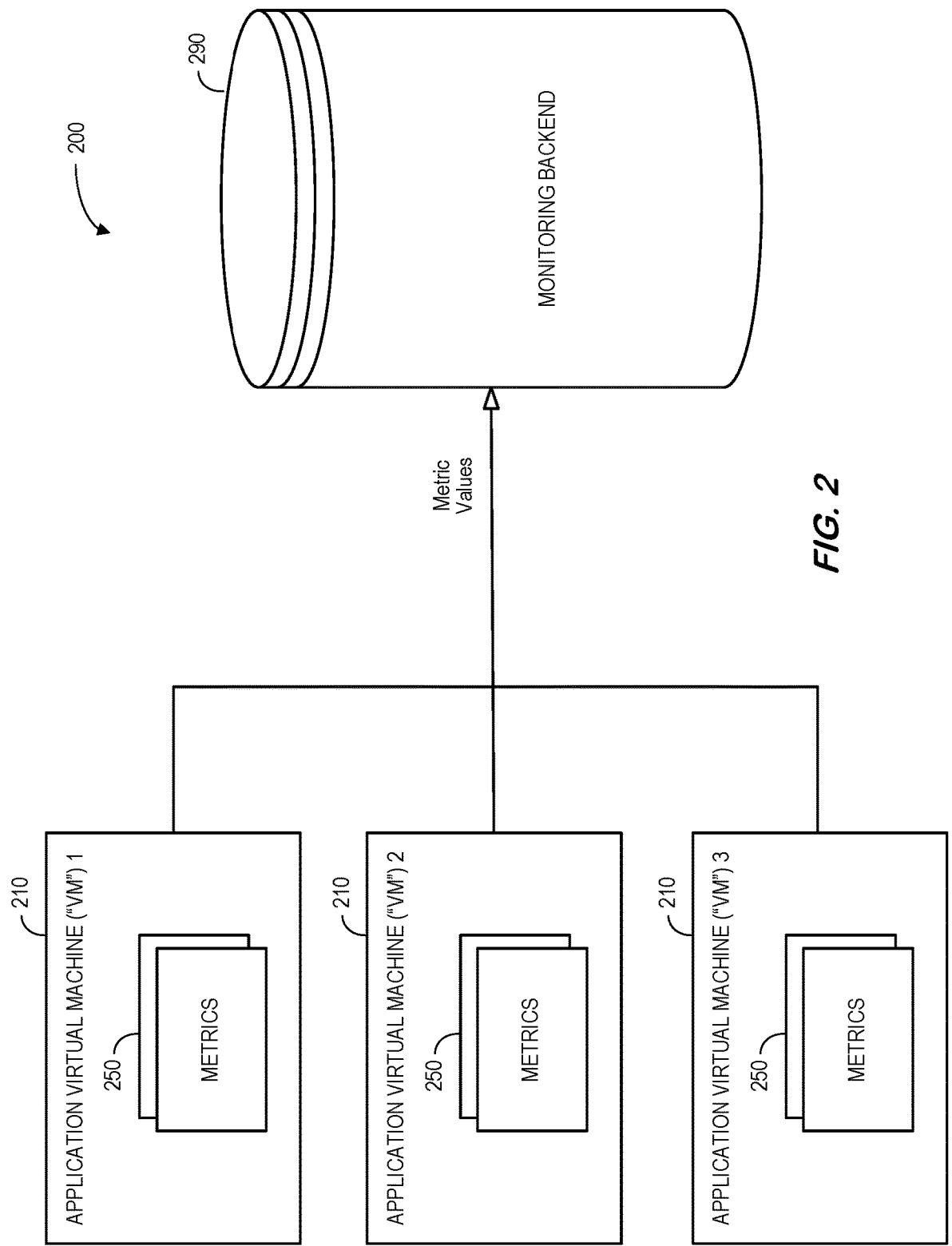
FIG. 2 is a system to consolidate metrics for a monitoring back-end in a traditional setup.

As a result, a cloud application vendor needs to be able to ask and answer many types of questions (which can get be quite complex), including questions that have not been thought of before. A traditional approach of thinking about potential questions up-front and implementing corresponding metrics/KPIs may therefore not be appropriate. For example, FIG. 1 is a system 100 to access locally available metrics from different sources to expose traditional metrics (and perform evaluations based on locally available data). In particular, an application virtual machine 110 may execute an application 120. Metrics 150 may collect information from the application 120, used services 140, and other sources 130 (e.g., application data, monitoring data, configuration data, etc.) and generate a scalar value 160 (e.g., a KPI value). FIG. 2 is a system 200 to consolidate metrics 250 from a number of different application virtual machines 210 (e.g., VM 1 through VM 3) for a monitoring backend 290 in a traditional setup.

In this traditional approach, the metrics/KPIs are designed up-front to provide data that may indicate normal operation or criticality. These values correspond to a set of pre-thought and built-in questions that are continuously answered by these metrics that are automatically executed on a regular basis. However, this data may not be sufficient to support new types of complex questions (that can arise on a continuous basis). The traditional metrics are defined as an algorithm, which operates on data that available in, or accessible from, the local application to calculate a scalar value output. The scalar value is then transferred to a central agent (usually a monitoring backend) for evaluation. However, these pre-determined types of scalar values representing enterprise information might not be suitable for new types of questions that will be asked by users.

Figure 3:
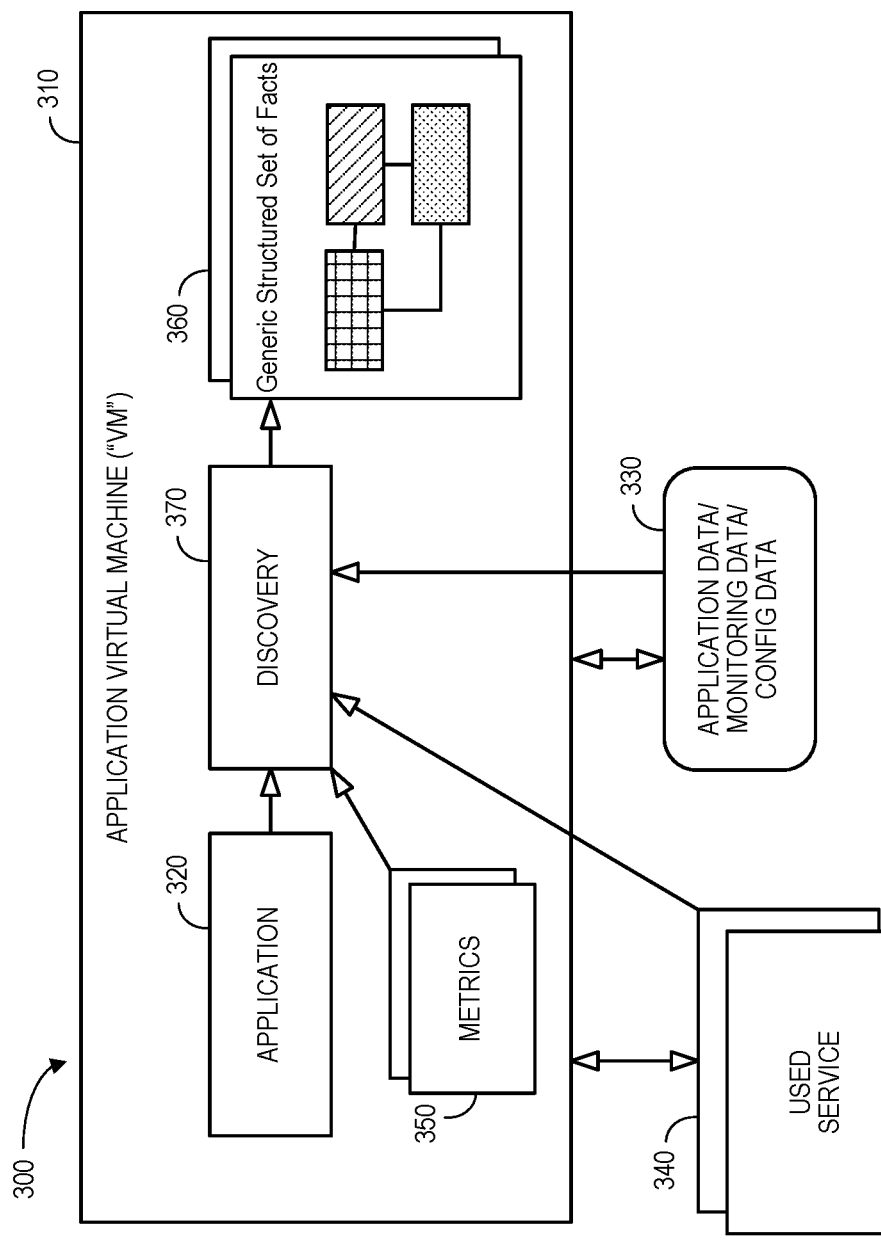
FIG. 3 is a high-level architecture for a system in accordance with some embodiments.

To reduce these problems, FIG. 3 is a high-level block diagram of a system 300 according to some embodiments. Note that the proposed architecture of the system may overcome limitations of the traditional approach (described in connection with FIGS. 1 and 2). As before, an application virtual machine 310 may execute an application 320. Discovery 370 may collect information from the application 320, metrics 350, used services 340, and other sources 330 (e.g., application data, monitoring data, configuration data, etc.) and automatically generate a generic structured set of facts 360. As used herein, the term "automatically" may refer to a process performed with little or no human intervention. Note that the discovery 370 may comprise an automated agent that collects the desired information.

According to some embodiments, devices, including those associated with the system 300 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 300 may store data into and/or retrieve data from various data stores which may be locally stored or reside remote from the discovery 370. Although a single discovery 370 is shown in FIG. 3, any number of such devices may be included. Moreover, various devices described herein might be combined according to embodiments of the present invention. Some or all of the system 300 functions may be performed by a constellation of networked apparatuses, such as in a distributed processing or cloud-based architecture.

Figure 4:
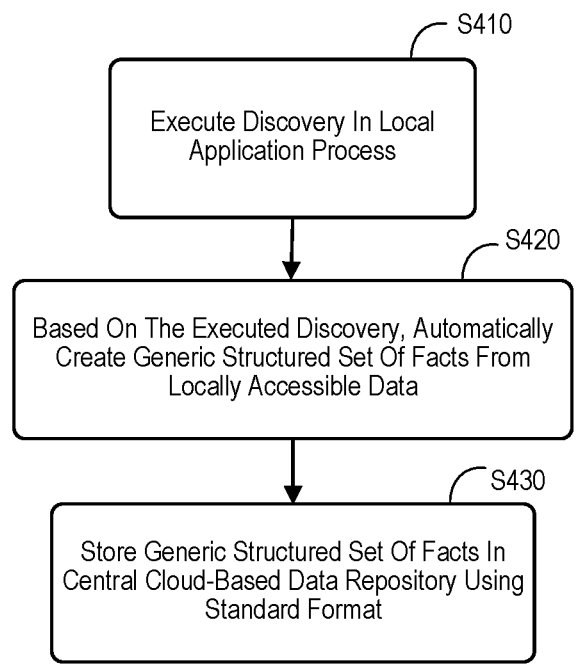
FIG. 4 illustrates a method according to some embodiments.

FIG. 4 illustrates a method to analyze enterprise information in an efficient and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a computer processor of a discovery engine, discovery in a local application process. Based on the executed discovery (e.g., execution on state change (event-based) and/or periodically (scheduled)), the system may automatically create a generic structured set of facts from locally accessible data at S420. According to some embodiments, the structured set of facts created at S4520 may include a set of general coordinates (or fact identifier) that lets the system locate independently discovered facts to combine them with actionable insights across cloud landscapes. At S430, the system may store the generic structured set of facts (e.g., in a central cloud-based data repository) using a standard format. As used herein, the phrase "central cloud-based data repository" may refer to a multitude of integrated, central cloud-based repositories of data (e.g., relational for interactive exploration of the data; time-series for interactive trend analysis over time; a (semi-structured) data lake for Machine Learning ("ML") and/or Artificial Intelligence ("AI") exploration of insights). Note that information may be stored in a standard format but not as files. According to some embodiments, JSON is used as an exchange format applicable for the messages sent by discoveries to the central cloud repository. The latter can then store the facts received (e.g., in a relational database scheme). According to some embodiments, the central cloud-based data repository may contain consolidated facts about all deployed applications (pertaining to a potentially very large number of enterprise customers). In some embodiments, the central cloud-based data repository stores facts from different application instances and/or facts from different applications. As these facts are received in the repository, they may be automatically correlated to form a consistent network of correlated data.

Thus, the traditional KPI/metrics approach is extended by the notion of a "discovery." Similar to a metric, a "discovery" may be executed in a local application instance and evaluate a subset of the locally available/accessible data. However, as opposed to a metric, the output of a discovery is a structured data record rather than a scalar value. A metric addresses a certain aspect or quality of an application and provides a value as a result. The discovery provides facts about a certain semantical domain. As opposed to a metric, these facts are represented by structured data records instead of a scalar value.

Figure 5:
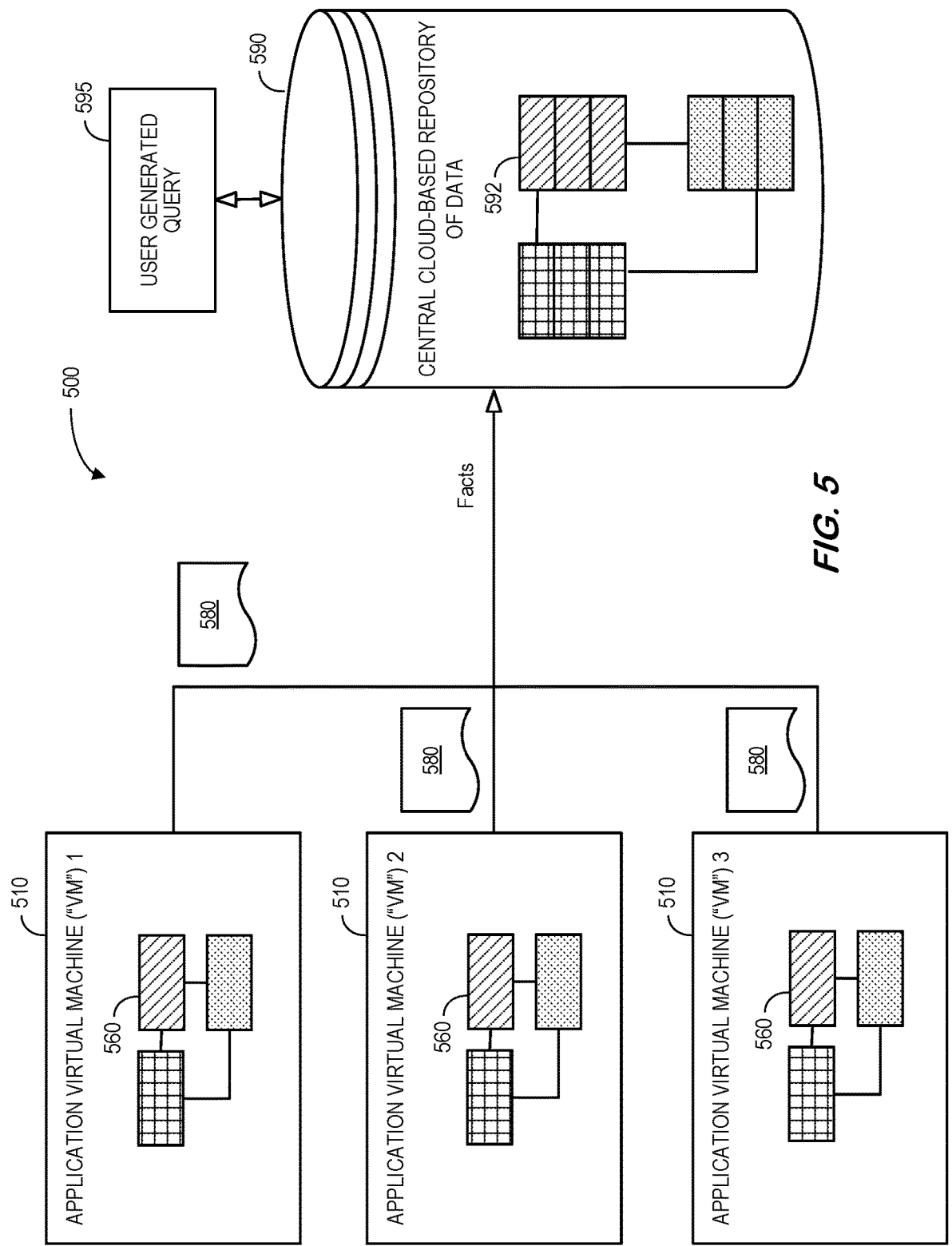
FIG. 5 is a system in which facts from different application instances are collected in a repository in accordance with some embodiments.
Figure 6:
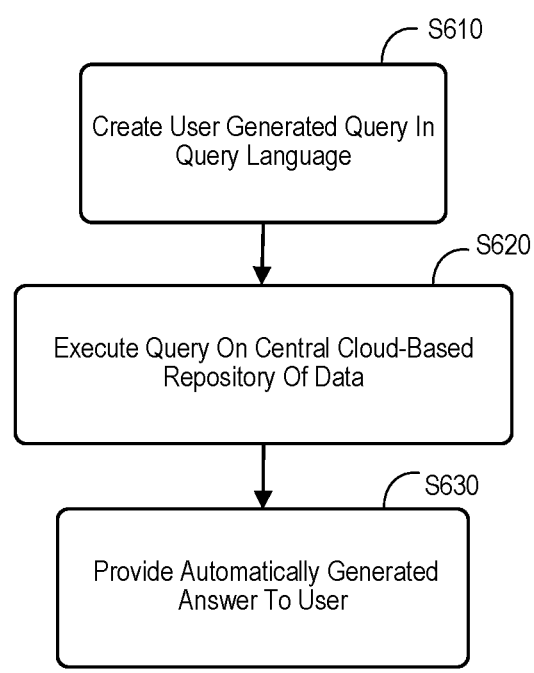
FIG. 6 is a query method (where a user creates a query in order to ask a specific question) according to some embodiments.

Moreover, these facts provided by the discovery are collected in a data repository, off which the questions can be answered For example, FIG. 5 is a system 500 in which facts 560 from different application instances 510 (e.g., views on local data) are collected in a central cloud-based repository of data 590 (e.g., a data lake) in accordance with some embodiments. A user generated query 595 can then be answered using consolidated facts 592 in the repository 590. A suitable in-flight representation 580 (e.g., a JSON document) for the facts may be chosen and this representation can be transformed to relational database records. FIG. 6 is a query method (where a user creates a query in order to ask a specific question) according to some embodiments. At S610, a user query may be created in a query language. The query language might be associated with, for example, a relational approach, a Structured Query Language ("SQL"), a time-series, the Cassandra Query Language ("CQL"), ML, AI, etc. At S620, the query may be executed on a central cloud-based repository of data. As a result of that execution, the system may provide an automatically generated answer to the user at S630.

Figure 7:
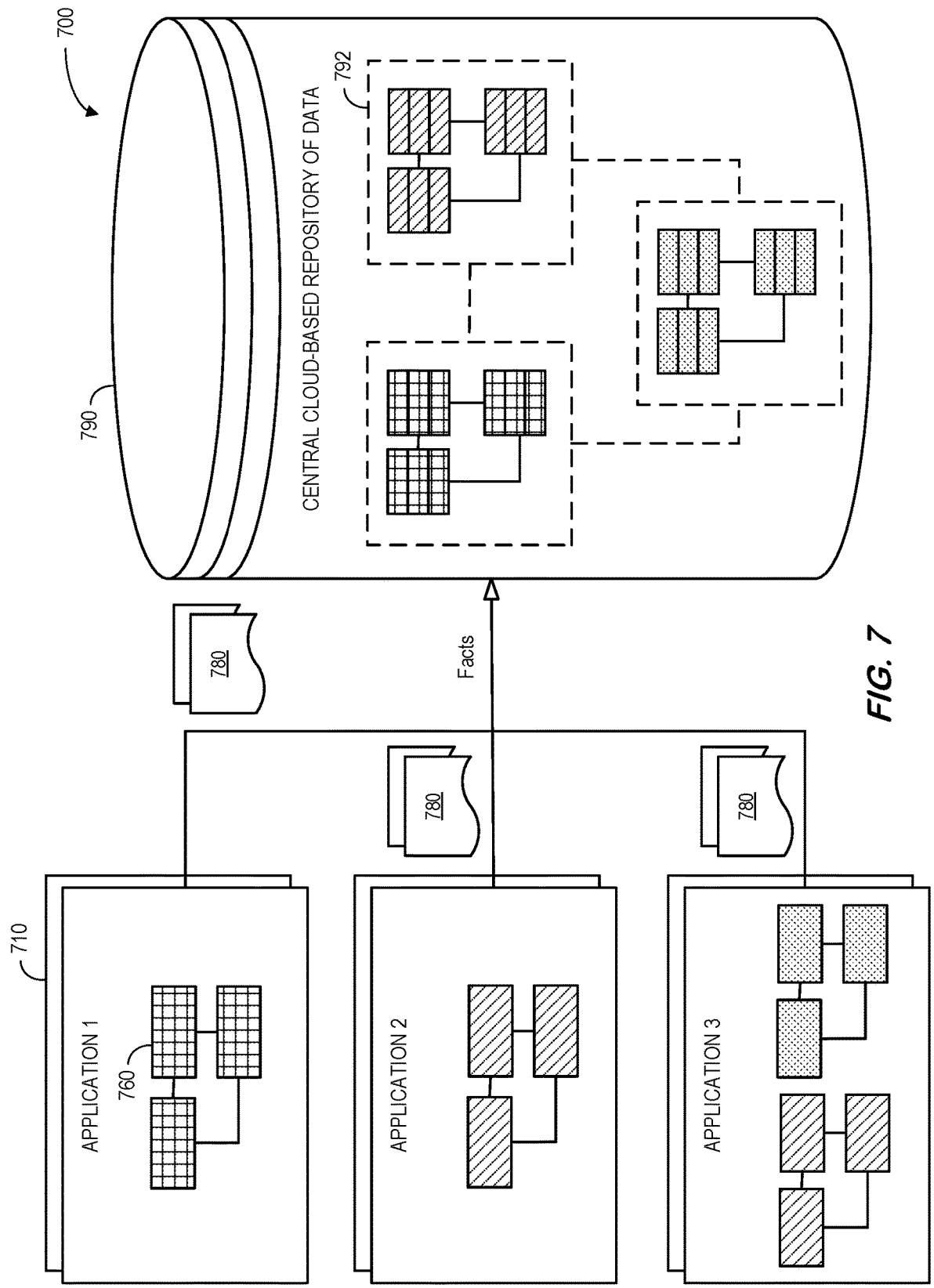
FIG. 7 is a system in which facts from different applications are collected in a repository in accordance with some embodiments.

Similarly, FIG. 7 is a system 700 in which facts 760 from different applications 710 are collected (e.g., views on local data via facts 780) in a repository 790 (e.g., a data lake) in accordance with some embodiments. Note that multiple application instances might be associated with the same application that is deployed a large number of times for a large set of customers (each of the customers owning their respective application instances). Moreover, the information in the repository 790 may be automatically consolidated and/or used to create new structures 792 (e.g., associated with a centrally consolidated graph of facts). As a result, embodiments may achieve a transformation of the complete deployment (with substantial amounts of associated data) to a manageable representation within this repository 790, summarizing all of the essential facts. This approach effectively decouples the local evaluation of data from a given domain and inferring insights based on this (and potentially other) data.

Figure 8:
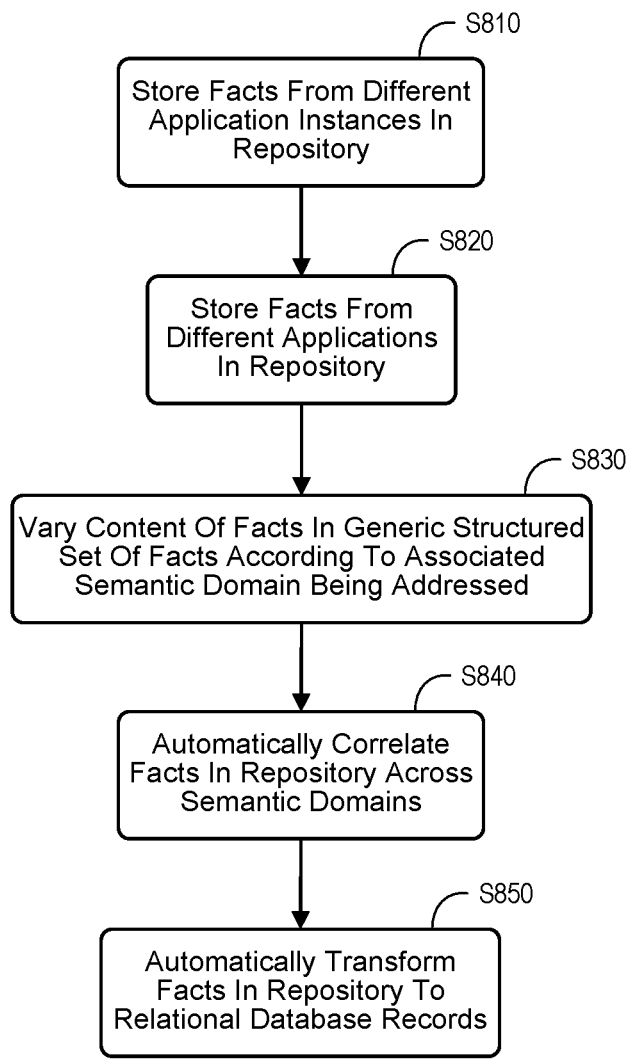
FIG. 8 is a fact ingestion method according to some embodiments.
Figure 9:
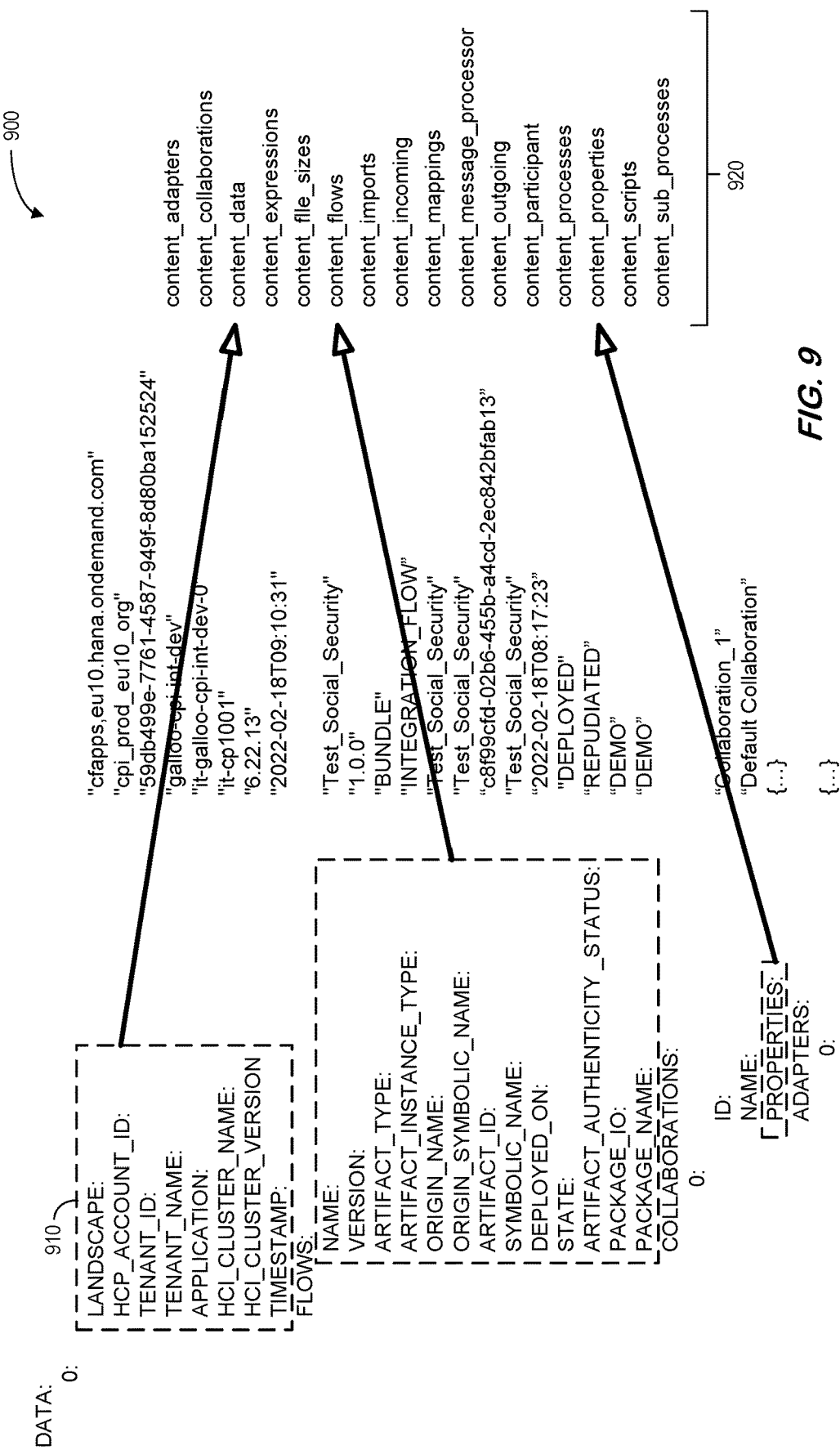
FIG. 9 illustrates fact ingestion in accordance with some embodiments.

FIG. 8 is a fact ingestion method according to some embodiments. At S810, facts from different application instances may be stored in a repository. At S820, facts from different applications may be stored in the repository. Note that the content of facts in a generic structured set of facts will vary based on the associated semantic domain being addressed at S830. At S840, the system may automatically correlate facts in the repository across semantic domains, and facts in the repository are automatically transformed to relational database records at S850. For example, FIG. 9 illustrates 900 fact ingestion in accordance with some embodiments. Here, a fact 910 (e.g., representing an integration flow) is automatically transformed to relational database records for a database table 920 named "content_data."

Note that when questions are asked by different stakeholders, they are expected to be answered across the complete set of deployments in multi-clouds (which might be tens of thousands of deployments). Embodiments provided herein may scale with the number of deployments in terms of resource usage and performance. The answers to the questions may be provided synchronously within the usual timeframe of user interaction (e.g., a few seconds or less). Furthermore, the approach is easily extensible (with minimum effort) to address new requirements simply by adding new discoveries (and the facts from these discoveries may be linked automatically to the existing model). Moreover, embodiments may retain historical data for a certain period so that the evolution of the answers over time can be inspected. The discovery approach requires few maintenance efforts and provides a cost-effective infrastructure that is agnostic about question specifics because it provides facts (information rich entities) instead of scalar metric values. The information extraction requires no changes in the data, as compared to an approach where scalar metrics are used (and an introduction of a new metric is needed). In addition, ingestion may allow for on-the-fly enhancement of persistence and a generic format of data (e.g., a header part for origin). Embodiments also allow for a potential feedback loop (e.g., automated actions based on telemetry insights) and/or an automated preparation of root cause analysis (including enhancing log levels).

The format of the user generated query may be associated with a language that can be well understood by both human and automated agents, with sufficient flexibility and richness to express any kinds of questions that might arise. One example of such a language that is already well-established in the community is the SQL protocol.

Reviewed answers to the questions may be provided in a consistent, structured generic representation, which includes the data of interest in the context of the hosting applications and/or tenants. The representation of the answers may also be understandable by both human actors and automated agents. While the content of the facts varies, depending on the semantical domain addressed, the system may still base all facts on a common meta schema. This approach may facilitate correlation among facts across semantical domains and evaluation by automated agents, such as a ML process.

Note that embodiments may be associated with facts representing all aspects of an application, such as application features, monitoring, configuration, resource usage, etc. For example, embodiments may combine business data and technical data. All of these facts (available for all deployed instances) are available in a central storage repository and form the basis for answering all kinds of questions across the complete deployment. Since facts are pieces of structured data adhering to a simple scheme with few requirements on the structure. This removes the need to have ingestion components (as in traditional approach) that map to a common data format. Note that embodiments may apply SQL as the language for formulating and executing the questions. The answers to any question, in turn, can be used as facts (which can be referenced by other questions) enabling flexible hierarchies.

With this approach, embodiments may unlock the potential of existing enterprise data and how it can be analyzed. Users are free to formulate questions ad-hoc and get answers about their areas of interest. Availability of structured, semantical facts may also help when applying machine learning techniques (e.g., supervised and unsupervised ML, inference algorithms, etc.). Moreover, the ability to correlate business data, monitoring data, configuration information, etc. in the manner described herein may help successfully operate a large cloud deployment in a scalable and cost-effective manner and help ensure customer satisfaction. This may let an enterprise put application qualities in context with monitoring data (success or error rates, throughput, performance and response times, resource consumption, etc.) and configuration data (is there an optimal, suboptimal, or wrong configuration, what are the impacts of changes in configuration, etc.). In other words, embodiments may provide a 360° view into how the application, or individual business scenarios within the application, are performing along with where—and how—the customer experience can be improved.

The embodiments described herein may be appropriate for a number of different use cases. For example, in an enterprise product management use case, product management may gain insight into customer adoption of application features and/or extensions or business scenarios (and the related customer experience) or in a content development use case the levels of adoption may be of interest. In a product support use case, embodiments may identify which customers are using problematic setup and/or configurations (and pro-actively suggest improvements).

Also consider a change management use case after a successful validation and updates are rolled out. These changes might refer to, for example, software updates or configuration settings. In this case, the system may want to assess the impact of these changes on all deployments: did it achieve the desired effect in all cases, or do the changes cause issues in some cases? In the latter case, it can be decided to either roll back the change, or to roll out a fix (fall-forward). In either case, the system may verify that all issues related to the change have been fixed. A similar use case is tracking changes done in a customer system, and whether these changes could be related to a potential problem that occurred as a result of that change.

An outage management use case might be associated with problems with platform or infrastructure services, and embodiments may identify affected deployments and the impact felt by the customers and/or business scenarios. Once an outage is fixed, embodiments may be used to verify recovery of previously affected deployments. A resource management use case may detect where there is a risk of a resource shortage (or when excessive usage of resources is happening) and put this into the context of business scenarios. The system can then adjust resources or improvements in the business scenarios (ideally, even before any impact is felt by the customer).

In a customer experience use case, embodiments may detect cases where customer scenarios are not performing ideally. In addition, applying ML techniques on top of telemetry data can identify groups of customers and/or business scenarios that share common characteristics (e.g., to help optimize setups for respective types of scenarios). In other use cases, embodiments may identify application instances using given versions of any versioned feature, service, or configuration setting. This may help identify usage of outdated or otherwise problematic versions. Likewise, embodiments may verify whether or not all applications have been updated successfully to a newer (e.g., current) version.

Figure 10:
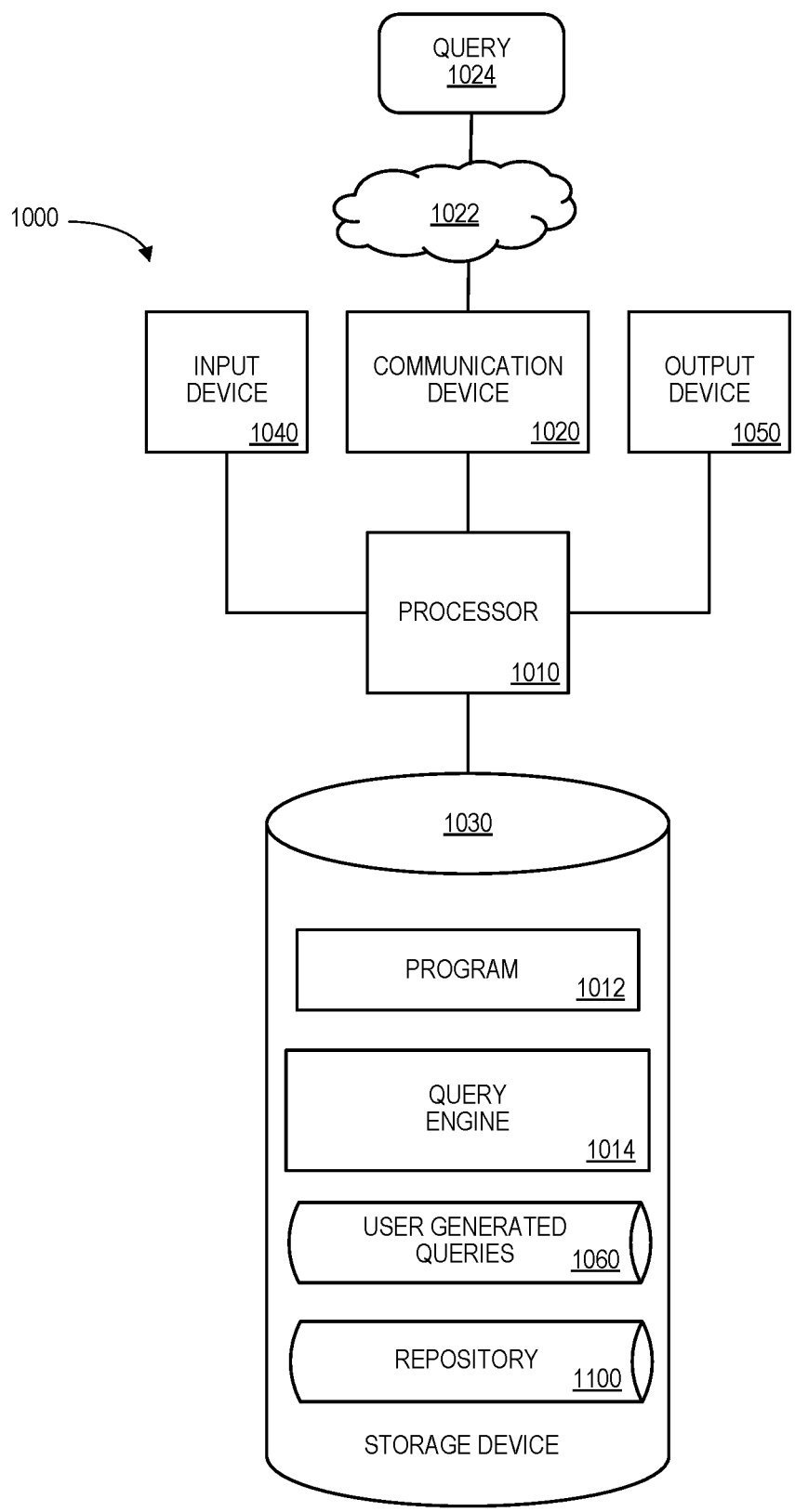
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the system 300 of FIG. 3, (and/or any other system described herein). The platform 1000 comprises a processor 1010, such as one or more commercially available CPUs in the form of one-chip microprocessors, coupled to a communication device 1020 configured to communicate via a communication network 1022. The communication device 1020 may be used to communicate, for example, with one or more remote user platforms or a remote query device 1024 via the communication network 1022. The platform 1000 further includes an input device 1040 (e.g., a computer mouse and/or keyboard to input data about queries) and an output device 1050 (e.g., a computer monitor to render a display, transmit recommendations or alerts, and/or create reports). According to some embodiments, a mobile device and/or PC may be used to exchange data with the platform 1000.

The processor 1010 also communicates with a storage device 1030. The storage device 1030 can be implemented as a single database, or the different components of the storage device 1030 can be distributed using multiple databases (that is, different deployment data storage options are possible). The storage device 1030 may comprise any appropriate data storage device, including combinations of magnetic storage devices (e.g., a hard disk drive), optical storage devices, mobile telephones, and/or semiconductor memory devices. The storage device 1030 stores a program 1012 and/or a query engine 1014 for controlling the processor 1010. The processor 1010 performs instructions of the programs 1012, 1014, and thereby operates in accordance with any of the embodiments described herein. For example, the processor 1010 may facilitate creation of a user generated query in a query language and execute the query to automatically generate an answer.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, data may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores user generated queries 1060 (e.g., including answers to those queries) and a repository 1100 of facts. An example of a database that may be used in connection with the platform 1000 will now be described in detail with respect to FIG. 11. Note that the database described herein is only one example, and additional and/or different data may be stored therein. Moreover, various databases might be split or combined in accordance with any of the embodiments described herein.

Figure 11:
FIG. 11 illustrates a repository in accordance with some embodiments.

Referring to FIG. 11, a table is shown that represents the repository 1100 that may be stored at the platform 1000 according to some embodiments. The table may include, for example, entries identifying facts that have been automatically discovered in connection with a cloud computing environment. The table may also define fields 1102, 1104, 1106, 1108 for each of the entries. The fields 1102, 1104, 1106, 1108 may, according to some embodiments, specify: an application (and virtual machine) identifier 1102, an application instance identifier 1104, a fact identifier 1106, and a centrally consolidated graph of facts 1108. The repository 1100 may be created and updated, for example, when a new application or application instance is explored, new facts are automatically discovered by a discover engine, etc.

The application (and virtual machine) identifier 1102 and application instance identifier 1104 might be unique alphanumeric labels or links that associated with cloud-based applications being executed and monitored by a discovery engine. The fact identifier 1106 may be associated with the facts gathered about that application along with metrics, used services information, application data, monitoring data, configuration data, etc. According to some embodiment 6s, JSON content is transferred to database tables. For the different types of facts (as produced by the different discoveries), there are corresponding tables that receive the respective data. Although JSON is used herein as an example, embodiments may be associated with other open standard formats and data interchange formats that use human-readable text to store and transmit data objects (e.g., attribute-value pairs and arrays). The JSON information may be used, according to some embodiments, to establish a centrally consolidated graph of facts 1108 for the application.

Thus, embodiments may separate data retrieval and data evaluation by using "discoveries" and "facts," thereby enabling flexible evaluation for any required insights. The facts may contain rich information for particular data domains (without need for mapping those to scalar values). In the data lake, embodiments may implicitly obtain a graph of facts and relational schemes in the data lake may be automatically generated based on the received facts. As a result, embodiments may establish extensible data pipeline that is agnostic with respect to the nature of transmitted data and that works in a fully automated manner. Note that embodiments may reduce complexity as compared to traditional approaches (which involve data providers, mappings, a common domain model, and a repository) because the designs described herein may have only one component that changes—the discovery. The discovery automatically enriches the domain model and therefore a new "transformer" per discovery is not needed.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 12:
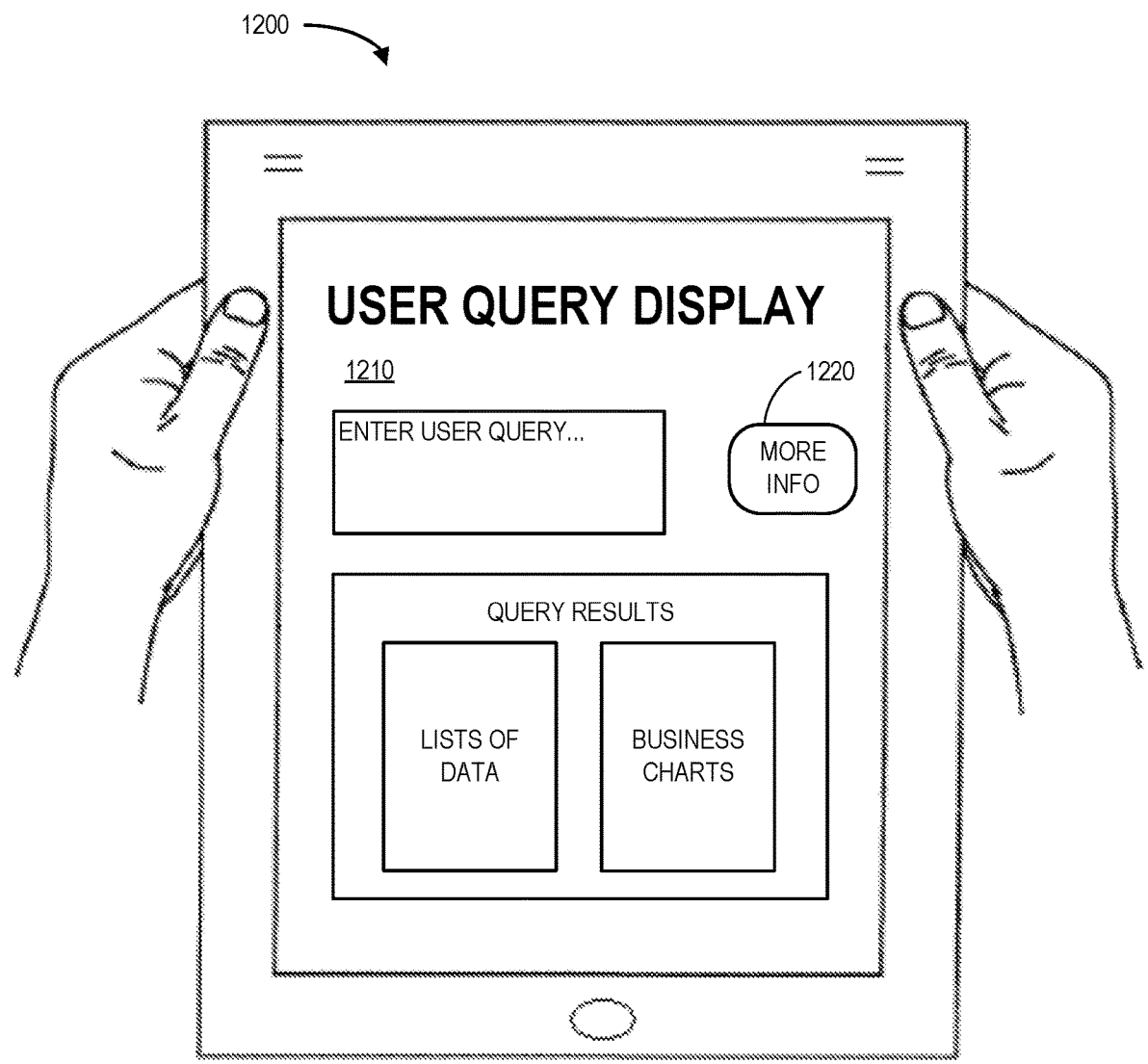
FIG. 12 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of enterprise queries, any of the embodiments described herein could be applied to other types of enterprise situations. Moreover, the displays shown herein are provided only as examples, and any other type of user interface could be implemented. For example, FIG. 12 shows a handheld tablet computer 1200 rendering a user query display 1210 that may be used The user query display 1210 may let the user execute some query (e.g., an ad-hoc or prepared query) and inspect the results, typically in the form of lists of data or business charts. In some cases, selection of a result by the user may provide additional details about the result (e.g., via a "More Info" icon 1220).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with enterprise information, comprising:
 a central cloud-based enterprise data repository containing consolidated facts about enterprise applications; and
 a discovery engine coupled to the cloud-based enterprise data repository, including:
  a computer processor, and
  a computer memory coupled to the computer processor and storing instructions that, when executed by the computer processor, cause the discovery engine to:
   (i) execute discovery in a local application process,
   (ii) based on the executed discovery, automatically create a generic structured set of facts from locally accessible data, and
   (iii) store the generic structured set of facts in the central cloud-based enterprise data repository using a standard format,
 wherein an automated Machine Learning ("ML") agent evaluates information from the central cloud-based enterprise data repository and a user generated query is created in a query language and executed to automatically generate an answer which is stored in the central cloud-based enterprise data repository as a fact that can be referenced by other queries to enable a flexible hierarchy.

2. The system of claim 1, wherein facts from different application instances are stored in the central cloud-based enterprise data repository.

3. The system of claim 1, wherein facts from different applications are stored in the central cloud-based enterprise data repository.

4. The system of claim 1, wherein the standard format comprises a data interchange format that uses human-readable text to store and transmit data objects.

5. The system of claim 1, wherein content of facts in the generic structured set of facts varies according to an associated semantic domain being addressed.

6. The system of claim 5, wherein the facts are based on a common meta-schema.

7. The system of claim 6, wherein facts in the central cloud-based enterprise data repository are automatically correlated across semantic domains.

8. The system of claim 7, wherein facts in the central cloud-based enterprise data repository are automatically transformed to relational database records.

9. The system of claim 1, wherein the query language is associated with at least one of: (i) a Structured Query Language ("SQL) protocol, (ii) a relational approach, (iii) a time-series, (iv) Machine Learning, and (v) Artificial Intelligence ("AI").

10. A computer-implemented method associated with enterprise information, comprising:
- executing, by a computer processor of a discovery engine, discovery in a local application process;
- based on the executed discovery, automatically creating a generic structured set of facts from locally accessible data;
- storing the generic structured set of facts in a central cloud-based enterprise data repository using a standard format, wherein the central cloud-based enterprise data repository contains consolidated facts about enterprise applications;
- evaluating, with an automated Machine Learning ("ML") agent, information from the central cloud-based enterprise data repository; and
- creating a user generated query in a query language and executing the query on the central cloud-based enterprise data repository to automatically generate an answer which is stored in the central cloud-based enterprise data repository as a fact that can be referenced by other queries to enable a flexible hierarchy.

11. The method of claim 10, wherein facts from different application instances are stored in the central cloud-based enterprise data repository.

12. The method of claim 10, wherein facts from different applications are stored in the central cloud-based enterprise data repository.

13. The method of claim 10, wherein the standard format comprises a data interchange format that uses human-readable text to store and transmit data objects.

14. The method of claim 10, wherein the query language is associated with at least one of: (i) a Structured Query Language ("SQL") protocol, (ii) a relational approach, (iii) a time-series, (iv) Machine Learning, and (v) Artificial Intelligence ("AI").

15. A non-transitory, machine-readable medium comprising instructions thereon that, when executed by a processor, cause the processor to execute operations to perform a method associated with enterprise information, the method comprising:
- executing, by a computer processor of a discovery engine, discovery in a local application process;
- based on the executed discovery, automatically creating a generic structured set of facts from locally accessible data;
- storing the generic structured set of facts in a central cloud-based enterprise data repository using a standard format, wherein the central cloud-based enterprise data repository contains consolidated facts about enterprise applications;
- evaluating, with an automated Machine Learning ("ML") agent, information from the central cloud-based enterprise data repository; and
- creating a user generated query in a query language and executing the query on the central cloud-based enterprise data repository to automatically generate an answer which is stored in the central cloud-based enterprise data repository as a fact that can be referenced by other queries to enable a flexible hierarchy.

16. The medium of claim 15, wherein content of facts in the generic structured set of facts varies according to an associated semantic domain being addressed.

17. The medium of claim 16, wherein the facts are based on a common meta-schema.

18. The medium of claim 17, wherein facts in the central cloud-based enterprise data repository are automatically correlated across semantic domains.

19. The medium of claim 18, wherein facts in the central cloud-based enterprise data repository are automatically transformed to relational database records.

* * * * *